United States Patent
Molchanov et al.

(10) Patent No.: US 11,150,919 B2
(45) Date of Patent: Oct. 19, 2021

(54) LOGGING OF SCRIPTS EXECUTED IN AN INFORMATION TECHNOLOGY WORKFLOW ORCHESTRATION SYSTEM

(71) Applicant: EMC IP Holding Company LLC, Hopkinton, MA (US)

(72) Inventors: Dmitry Vladimirovich Molchanov, Saint-Petersburg (RU); Nickolay Sergeevich Ovdienko, Leningrad Oblast (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 16 days.

(21) Appl. No.: 16/934,162

(22) Filed: Jul. 21, 2020

(65) Prior Publication Data
US 2021/0224084 A1 Jul. 22, 2021

(30) Foreign Application Priority Data
Jan. 20, 2020 (RU) .......................... RU2020102012

(51) Int. Cl.
*G06F 9/44* (2018.01)
*G06F 9/451* (2018.01)
(Continued)

(52) U.S. Cl.
CPC ............... *G06F 9/451* (2018.02); *G06F 8/31* (2013.01); *G06F 9/44526* (2013.01); *G06F 9/45529* (2013.01); *G06F 9/4843* (2013.01)

(58) Field of Classification Search
None
See application file for complete search history.

(56) References Cited

U.S. PATENT DOCUMENTS

2013/0263156 A1* 10/2013 Nakagawa .......... G06F 11/3476
　　　　　　　　　　　　　　　　　　　　　　　　719/318
2016/0301561 A1* 10/2016 Petersen ................. H04L 67/10
(Continued)

OTHER PUBLICATIONS

Hegarty, "vRO Content Pack for vRealize Log Insight" (Year: 2017).*

(Continued)

*Primary Examiner* — Insun Kang
(74) *Attorney, Agent, or Firm* — Ryan, Mason & Lewis, LLP

(57) ABSTRACT

An apparatus is configured to create a logging template comprising instructions for managing logging of scripts executed from a front-end and implemented in a back-end of an information technology workflow orchestration system. The apparatus is also configured to provide the logging template in a catalog of application programming interfaces in a user interface of the front-end enabling selection of instructions from the logging template for inclusion in scripts generated in the front-end. The processing device is further configured to generate a given script by selecting, utilizing the user interface, a set of elements from the catalog including one or more instructions from the logging template. The processing device is further configured to execute the given script in the front-end utilizing at least one of the instructions from the logging template to view, in the user interface of the front-end, logs produced by the back-end in response to the given script.

20 Claims, 13 Drawing Sheets

(51) Int. Cl.
  *G06F 8/30* (2018.01)
  *G06F 9/48* (2006.01)
  *G06F 9/455* (2018.01)
  *G06F 9/445* (2018.01)

(56) References Cited

U.S. PATENT DOCUMENTS

2019/0155786 A1* 5/2019 Rees ............... G06F 3/0643
2019/0370160 A1* 12/2019 Raman ............ G06F 11/3664

OTHER PUBLICATIONS

Vmware, Inc. "vRO Plug-in for Dell EMC XtremIO," https://marketplace.vmware.com/vsx/solutions/vro-plug-in-for-dell-emc-xtremio-4-0, Accessed Jan. 6, 2020, 5 pages.

Dell EMC, "Implementing a Private Cloud with VMware vRealize and Dell EMC XtremIO X2," Apr. 2018, 131 pages.

K. Dolan, "Dell EMC XtremIO X2: Delivering High Performance and Advanced Functionality for Virtualized Environments," Enterprise Strategy Group, ESG Lab Review, Jul. 18, 2018, 11 pages.

Vmware, Inc. "Developing with VMware vRealize Orchestrator," 2018, 296 pages.

Vmware, Inc. "VMware vRealize Orchestrator," Datasheet, 2019, 2 pages.

Vmware, Inc. "vRealize Orchestrator Coding Design Guide," Technical White Paper, Mar. 2016, 30 pages.

* cited by examiner

WORKFLOW ORCHESTRATION SYSTEM EDIT INTERFACE

GENERAL | INPUTS | OUTPUTS | SCHEMA | PRESENTATION | ...

| SELECTION INTERFACE | SELECTED INPUT PARAMETER |
|---|---|
| INPUT PARAMETER 1<br>INPUT PARAMETER 2<br>... | NAME/ELEMENT<br><br>DESCRIPTION |
| | INPUT PARAMETER EDIT INTERFACE |
| | PROPERTY 1      VALUE 1<br>PROPERTY 2      VALUE 2<br>...                   ... |

```
public class DebugHelper { private static class DebugHelperHolder {
        private static final DebugHelper helper = new DebugHelper();
    } public static DebugHelper getInstance() {
        return DebugHelperHolder.helper;
    }

/**
     * Returns the singleton DebugHelper to be used inside scripting.
     * @param factory IPluginFactory implementation
     * @return DebugHelper singleton.
     */
    public static DebugHelper createScriptingSingleton(IPluginFactory factory) {
        return getInstance();
    } public List<String> getMemoryLogs() {
        return Out.memLogs;
    } public void clearMemoryLogs() {
        Out.clearMemoryLogs();
    } public void addToMemoryLogs(String msg) {
        Out.addToMemoryLogs(msg);
    } public void setDebugLevel(int level) {
        Out.setDebugLevel(level);
    }
}
```

FIG. 5

```xml
<scripting-objects>
<object script-name="_XmsDebugHelper" java-class="com.xio.model.DebugHelper" create="false" strict="true">
    <description><![CDATA[XtremeIO debug helper class.]]></description>
    <singleton datasource="main-datasource" script-name="XmsDebugHelper"/>
    <methods>
        <method script-name="getMemoryLogs" java-name="getMemoryLogs" return-type="String">
            <description><![CDATA[Returns the list of memorized logs.]]></description>
        </method>
        <method script-name="clearMemoryLogs" java-name="clearMemoryLogs" return-type="void">
            <description><![CDATA[Clears the list of memorized logs.]]></description>
        </method>
        <method script-name="addToMemoryLogs" java-name="addToMemoryLogs" return-type="void">
            <description><![CDATA[Adds a message to the list of logs in memory.]]></description>
            <parameters>
                <parameter name="msg" type="String"><![CDATA[Message to add]]></parameter>
            </parameters>
        </method>
        <method script-name="setDebugLevel" java-name="setDebugLevel" return-type="void">
            <description><![CDATA[Define debug level.]]></description>
            <parameters>
                <parameter name="level" type="Integer"><![CDATA[Level 1 – to enable debugging, 0 – to disable]]></parameter>
            </parameters>
        </method>
        <method script-name="getDebugLevel" java-name="getDebugLevel" return-type="Integer">
            <description><![CDATA[Get debug level.]]></description>
        </method>
    </methods>
</object>
```

FIG. 6

APPLICATION PROGRAMMING INTERFACE (API) EXPLORER

| LIST OF AVAILABLE APIs | API SEARCH INTERFACE |
|---|---|

...
XmsDebugHelper
 -addToMemoryLogs(String) : void
 -clearMemoryLogs() | void
 -getDebugLevel() | Integer
 -getMemoryLogs() | String[]
 -setDebugLevel(Integer) | void
...

METHOD: addToMemoryLogs

Description:
 Adds a message to the list of logs in memory.

Signature:
 void addToMemoryLogs(String msg)

Parameters:
 -msg(String)
  *Message to add*

Return Type: void

```
function writeToDebugHelper(msg) {
    if (typeof(XmsDebugHelper) != 'undefined' && XmsDebugHelper) {
        XmsDebugHelper.addToMemoryLogs(msg);
    }
}
```

FIG. 8

LOGGING OF SCRIPTS EXECUTED IN AN INFORMATION TECHNOLOGY WORKFLOW ORCHESTRATION SYSTEM

RELATED APPLICATION(S)

The present application claims priority to Russian Patent Application No. 2020102012, filed Jan. 20, 2020 and entitled "Logging of Scripts Executed in an Information Technology Workflow Orchestration System," which is incorporated by reference herein in its entirety.

FIELD

The present invention relates generally to the field of information processing, and more particularly to techniques for logging in information processing systems.

BACKGROUND

Managing information technology (IT) tasks can be challenging, particularly as IT environments and infrastructure continue to grow in complexity. Various tools may be used to simplify the automation of complex IT tasks, such as management and operational tasks for assets and resources in IT environments. As an example, workflow orchestration software may provide a graphical user interface that enables users to design, develop and execute custom workflows for automating complex IT tasks in an IT environment.

SUMMARY

Illustrative embodiments of the present disclosure provide techniques for logging of scripts executed in an information technology workflow orchestration system.

In one embodiment, an apparatus comprises at least one processing device comprising a processor coupled to a memory. The at least one processing device is configured to create a logging template comprising a set of instructions for managing logging of scripts executed from a front-end of an information technology workflow orchestration system that are implemented in a back-end of the information technology workflow orchestration system, and to provide the logging template in a catalog of application programming interfaces in a user interface of the front-end of the information technology workflow orchestration system, the user interface enabling selection of one or more of the set of instructions from the logging template for inclusion in one or more scripts generated in the front-end of the information technology workflow orchestration system. The at least one processing device is also configured to generate a given script by selecting, utilizing the user interface, a set of elements from the catalog of application programming interfaces, the set of elements comprising one or more of the set of instructions from the logging template. The at least one processing device is further configured to execute the given script in the front-end of the information technology workflow orchestration system, wherein executing the given script comprises utilizing at least one of the set of instructions from the logging template to view, in the user interface of the front-end of the information technology workflow orchestration system, logs produced by the back-end of the information technology workflow orchestration system in response to the given script.

These and other illustrative embodiments include, without limitation, methods, apparatus, networks, systems and processor-readable storage media.

BRIEF DESCRIPTION OF THE DRAWINGS

FIG. 3B shows another view of an information technology workflow orchestration system edit interface in an illustrative embodiment.

FIG. 5 shows psuedocode for a Java class for implementing a common logger in an illustrative embodiment.

FIG. 6 shows pseudocode for a scripting object plugin in an illustrative embodiment.

FIG. 7 shows an application programming interface explorer dialog of an information technology workflow orchestration system in an illustrative embodiment.

FIG. 8 shows pseudocode for adding a logging method from a common logger into a script in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
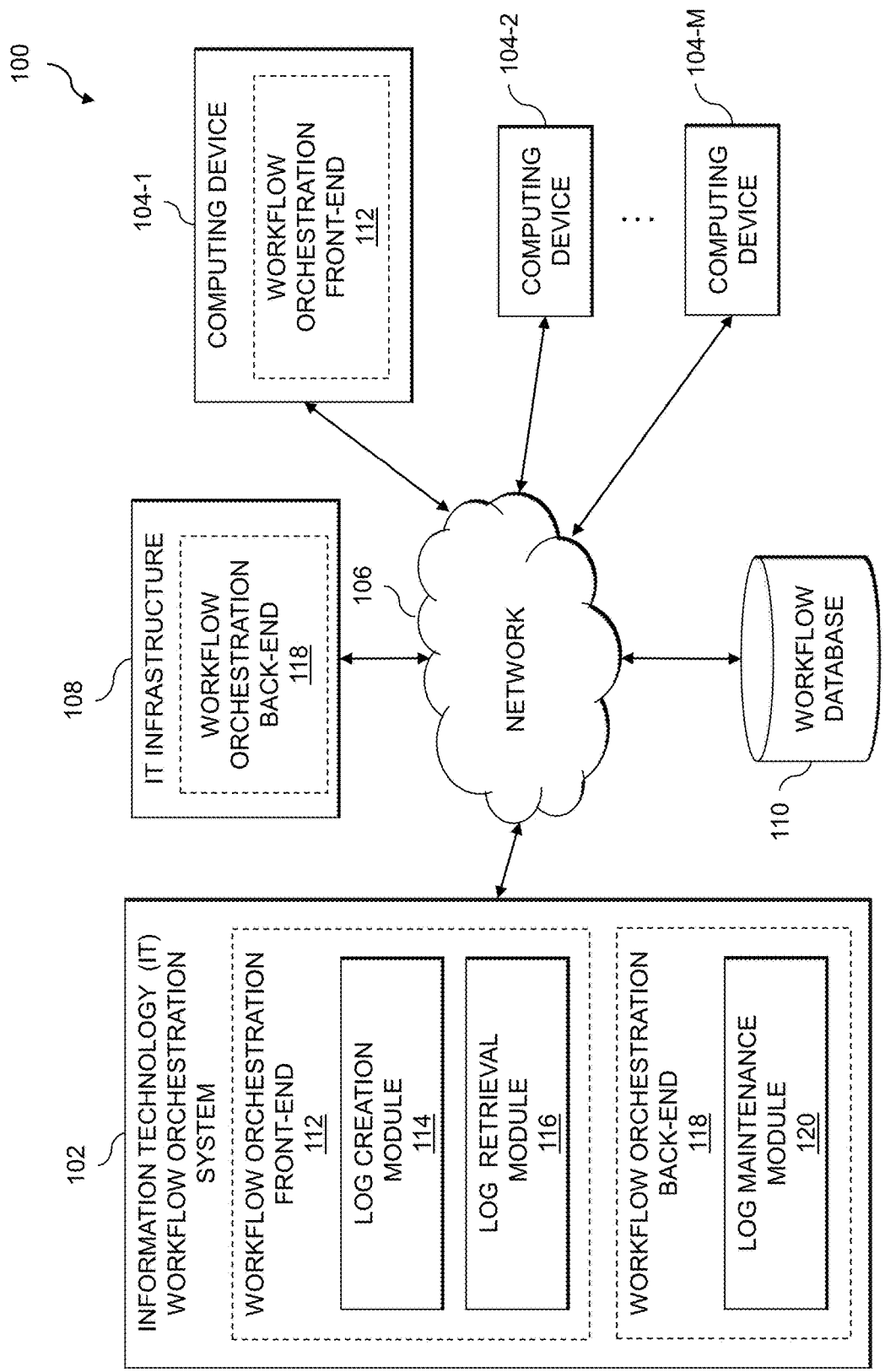
FIG. 1 is a block diagram of an information processing system for logging of scripts executed in an information technology workflow orchestration system in an illustrative embodiment.

FIG. 1 shows an information processing system 100 configured in accordance with an illustrative embodiment. The information processing system 100 is assumed to be built on at least one processing platform and provides functionality for logging of scripts executed in an information technology (IT) workflow orchestration system 102. The scripts, which may be executed in a front-end 112 or back-end 118 of the IT workflow orchestration system 102, as will be described in further detail blow, may include workflows and actions. The actions may be part of the body of a workflow schema for a given workflow, or may be triggered in a presentation interface (e.g., an input form with small pieces of reusable code or action calls).

The workflow orchestration system 102 is accessed or utilized by users of a set of computing devices 104-1, 104-2, . . . 104-M (collectively, computing devices 104). The IT workflow orchestration system 102 and computing devices 104 are coupled to a network 106. Also coupled to the network 106 is an IT infrastructure 108 that comprises assets on which the actions are orchestrated and a workflow database 110 configured to store various information utilized by the IT workflow orchestration system 102 (e.g., a catalog of workflows and actions, logs, etc.).

The IT workflow orchestration system 102 includes a workflow orchestration front-end 112 (also referred to herein as front-end 112) and a workflow orchestration back-end 118 (also referred to herein as back-end 118). The front-end 112 may be implemented at least partially in one or more of the computing devices 104, such as computing device 104-1 as illustrated in FIG. 1. For example, the computing device 104-1 may run an application or other software that provides access to the IT workflow orchestration system 102, where a user of the client device can interact with the front-end to trigger workflows, actions or other scripts that are implemented in the back-end 118. In some embodiments, the back-end 118 comprises Java classes that include Java methods or other software or application programming interfaces (APIs) that implement the actions, workflows or other scripts executed from JavaScript (e.g., Java methods represented or proxied by scripting objects or classes in the front-end 112). In this case, the JavaScript may be called or otherwise triggered by a user of the computing device 104-1, though the JavaScript and Java classes and methods may be saved on a server implementing the IT workflow orchestration system 102. Thus, FIG. 1 shows the front-end 112 in dashed boxes in both the IT workflow orchestration system 102 and the computing device 104-1. It should be appreciated that the front-end 112 may be implemented at least partially in both the IT workflow orchestration system 102 and computing device 104-1, or in just one of the IT workflow orchestration system 102 and computing device 104-1.

The back-end 118 of the IT workflow orchestration system 102 may similarly be implemented at least in part by both the IT workflow orchestration system 102 and the IT infrastructure 108. For example, the IT workflow orchestration system 102 may include plugins that are configured to extend functionality of the IT workflow orchestration system 102 for particular types of IT assets in the IT infrastructure 108, and thus the plugins may be viewed as running in both the IT workflow orchestration system 102 and the associated assets of the IT infrastructure 108. Assets of the IT infrastructure 108 may include physical computing resources (e.g., servers, storage systems and arrays, network equipment, etc.) and virtualized computing resources (e.g., virtual machines (VMs), software containers, etc.).

The computing devices 104 may comprise, for example, physical computing devices such as Internet of Things (IoT) devices, mobile telephones, laptop computers, tablet computers, desktop computers or other types of devices, in any combination. Such devices are examples of what are more generally referred to herein as "processing devices." Some of these processing devices are also generally referred to herein as "computers." The computing devices 104 may also or alternately comprise virtualized computing resources, such as VMs, software containers, etc.

The computing devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The workflow database 110, as discussed above, is configured to store and record information relating to the IT workflow orchestration system 102. As noted above, such information may include a catalog of reusable pieces of code or other scripts (e.g., actions, workflows, APIs, etc.) that are used in constructing workflows in the IT workflow orchestration system 102. Such information may also or alternatively include logs generated by actions and workflows triggered in the front-end 112 of the IT workflow orchestrations system 102 as described elsewhere herein.

The workflow database 110 in some embodiments is implemented using one or more storage systems or devices associated with the IT workflow orchestration system 102 or the IT infrastructure 108. In some embodiments, one or more of the storage systems utilized to implement the workflow database 110 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the IT workflow orchestration system 102, the computing devices 104, the IT infrastructure 108 or assets thereof, and the workflow database 110, as well as to support communication between such components and other related systems and devices not explicitly shown.

Although shown as a separate element in this embodiment, the IT workflow orchestration system 102 in other embodiments can be implemented at least in part within one or more of the computing devices 104 and/or the IT infrastructure 108.

The IT workflow orchestration system 102 is assumed to be implemented using at least one processing device. Each such processing device generally comprises at least one processor and an associated memory, and implements one or more functional modules for controlling certain features of the IT workflow orchestration system 102. In the FIG. 1 embodiment, the front-end 112 of the IT workflow orchestration system 102 comprises a log creation module 114 and a log retrieval module 116, and the back-end 118 of the IT workflow orchestration system 102 comprises a log maintenance module 120.

The front-end 112 is configured to create a logging template comprising a set of instructions for managing logging of scripts executed from the front-end 112 that are implemented in the back-end 118. The logging template is provided in a catalog of APIs in a user interface of the front-end 112. The user interface of the front-end 112 enables selection of one or more of the set of instructions from the logging template (as well as other actions and workflows from the catalog) for inclusion in one or more scripts generated in the front-end 112 of the IT workflow orchestration system 102. The front-end 112 is configured to generate a given script by selecting, utilizing the user interface, a set of elements from the catalog of APIs, the set of elements comprising one or more of the set of instructions from the logging template. The log creation module 114 is configured to generate or cause the back-end 118 to produce logs when the scripts are executed from the front-end 112 and call associated instructions from the logging template.

The front-end 112 is further configured to execute the given script, wherein executing the given script comprises utilizing the log retrieval module 116 and at least one of the set of instructions from the logging template to view, in the user interface of the front-end 112, logs produced by the back-end 118 in response to the given script being executed. The back-end 118 utilizes log maintenance module 120 to generate and maintain the logs.

In some embodiments, the computing devices 104 may implement host agents that are configured for communication with the IT workflow orchestration system 102. Such host agents may be configured to interact with APIs of the front-end 112 of the IT workflow orchestration system 102 to design and execute various scripts that cause the back-end 118 of the IT workflow orchestration system 102 to perform tasks in or on assets of the IT infrastructure 108.

It should be noted that a "host agent" as this term is generally used herein may comprise an automated entity, such as a software entity running on a processing device. Accordingly, a host agent need not be a human entity.

It is to be appreciated that the particular arrangement of the IT workflow orchestration system 102, the front-end 112, the log creation module 114, the log retrieval module 116, the back-end 118, and the log maintenance module 120 illustrated in the FIG. 1 embodiment is presented by way of example only, and alternative arrangements can be used in other embodiments. As discussed above, for example, the IT workflow orchestration system 102 or portions thereof such as the front-end 112 and back-end 118 may be implemented at least in part internally to one or more of the computing devices 104 and the IT infrastructure 108. As another example, the functionality associated with the log creation module 114, log retrieval module 116 and log maintenance module 120 may be combined into one module, or separated across more than three modules with the multiple modules possibly being implemented with multiple distinct processors or processing devices.

At least portions of the log creation module 114, log retrieval module 116 and log maintenance module 120 may be implemented at least in part in the form of software that is stored in memory and executed by a processor.

It is to be understood that the particular set of elements shown in FIG. 1 for logging of scripts executed in the front-end 112 of the IT workflow orchestration system 102 is presented by way of illustrative example only, and in other embodiments additional or alternative elements may be used. Thus, another embodiment may include additional or alternative systems, devices and other network entities, as well as different arrangements of modules and other components.

The IT workflow orchestration system 102 or components thereof, as well as other portions of the system 100 such as the IT infrastructure 108 may be part of cloud infrastructure as will be described in further detail below.

The IT workflow orchestration system 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The IT infrastructure 108, computing devices 104 and the IT workflow orchestration system 102 or components thereof (e.g., the front-end 112, the log creation module 114, the log retrieval module 116, the back-end 118, and the log maintenance module 120) may be implemented on respective distinct processing platforms, although numerous other arrangements are possible. For example, in some embodiments at least portions of the IT workflow orchestration system 102 and one or more of the computing devices 104 are implemented on the same processing platform. A given computing device (e.g., 104-1) can therefore be implemented at least in part within at least one processing platform that implements at least a portion of the IT workflow orchestration system 102. Similarly, at least portions of the IT workflow orchestration system 102 and one or more assets of the IT infrastructure 108 may be implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the IT workflow orchestration system 102, the computing devices 104, the IT infrastructure 108 and the workflow database 110, or portions or components thereof, to reside in different data centers. Numerous other distributed implementations are possible. The IT workflow orchestration system 102 or portions thereof can also be implemented in a distributed manner across multiple data centers.

Additional examples of processing platforms utilized to implement the IT workflow orchestration system 102 and other portions of the system 100 in illustrative embodiments will be described in more detail below in conjunction with FIGS. 9 and 10.

It is to be appreciated that these and other features of illustrative embodiments are presented by way of example only, and should not be construed as limiting in any way.

Figure 2:
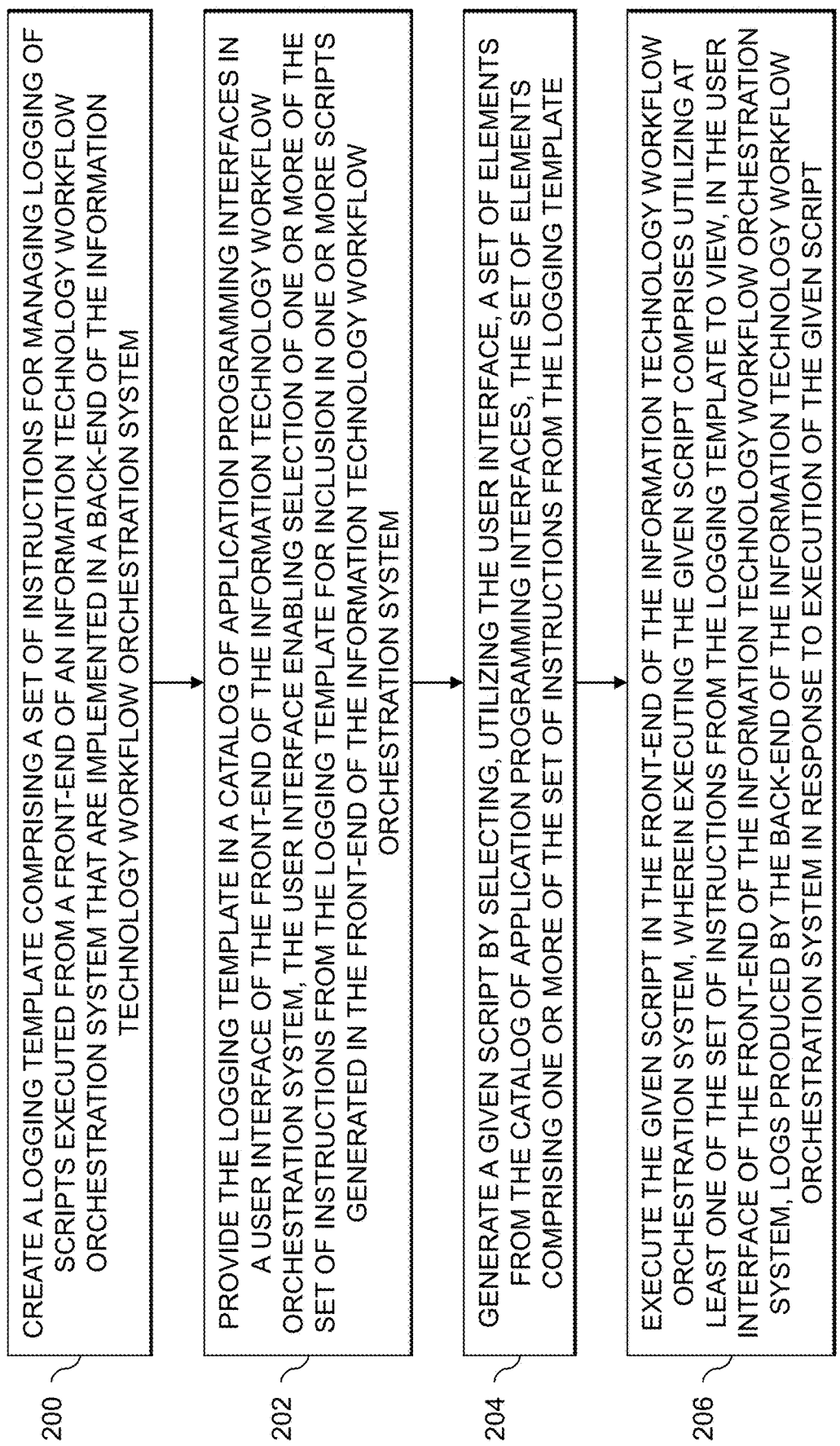
FIG. 2 is a flow diagram of an exemplary process for logging of scripts executed in an information technology workflow orchestration system in an illustrative embodiment.

An exemplary process for logging of scripts executed in an IT workflow orchestration system will now be described in more detail with reference to the flow diagram of FIG. 2. It is to be understood that this particular process is only an example, and that additional or alternative processes for logging of scripts executed in an IT workflow orchestration system may be used in other embodiments.

In this embodiment, the process includes steps 200 through 206. These steps are assumed to be performed by the log creation module 114, log retrieval module 116 and log maintenance module 120 of the IT workflow orchestration system 102. The process begins with step 200, creating a logging template comprising a set of instructions for managing logging of scripts executed from the front-end 112 of the IT workflow orchestration system 102 that are implemented in the back-end 118 of the IT workflow orchestration system 102.

In step 202, the logging template is provided in a catalog of APIs provided in a user interface of the front-end 112 of the IT workflow orchestration system. The user interface enables selection of one or more of the set of instructions from the logging template for inclusion in one or more scripts generated in the front-end 112 of the IT workflow orchestration system 102.

A given script is generated in step 204 by selecting, utilizing the user interface, a set of elements from the catalog of APIs, where the set of elements comprises one or more of the set of instructions from the logging template. In step 206, the given script is executed in the front-end 112 of the IT workflow orchestration system 102. Executing the given script comprises utilizing at least one of the set of instructions from the logging template to view, in the user interface of the front-end 112 of the IT workflow orchestration system 102, logs produced by the back-end 118 of the IT workflow orchestration system 102 in response to execution of the given script.

In some embodiments, the given script generated in step 204 may comprise one or more actions configured to be triggered in a presentation interface in the front-end 112 of the IT workflow orchestration system 102, where the one or more instructions of the logging template in the given script comprise: a first instruction for writing one or more logs in the back-end 118 of the IT workflow orchestration system 102 in response to one or more of the actions triggered in the presentation interface in the front-end 112 of the IT workflow orchestration system 102; and at least a second instruction for reading and viewing, in the presentation interface in the front-end 112 of the IT workflow orchestration system 102, the one or more logs written in the back-end 118 of the IT workflow orchestration system 102.

In other embodiments, the given scriptable task comprises at least one of an action and a workflow configured to be triggered in the front-end 112 of the IT workflow orchestration system 102 that calls an instruction for writing one or more logs in the back-end 118 of the IT workflow orchestration system 102, where the one or more instructions of the logging template in the given scriptable task comprise at least one instruction for reading and viewing, in the front-end 112 of the IT workflow orchestration system 102, the one or more logs written in the back-end 118 of the IT workflow orchestration system 102.

In some embodiments, the given script generated in step 204 is configured to automate one or more orchestration actions for a storage array or other type of asset in the IT infrastructure 108. In such embodiments, the back-end 118 of the IT workflow orchestration system 102 may comprise a plug-in that executes on a management server of the storage array or other asset in the IT infrastructure 108. The plugin may comprise one or more Java classes and methods executing in the back-end 118 of the IT workflow orchestration system 102 that are configured to be called by JavaScript methods in the front-end 112 of the IT workflow orchestration system 102. The logging template may comprise a Java class with one or more methods for managing logging of actions, and the plugin may further comprise a description file with descriptions of the one or more methods for managing logging of scripts, where the description file when loaded into the IT workflow orchestration system 102 populates the catalog of APIs with the descriptions of the one or more methods. The one or more methods for managing logging of scripts may comprise a method for adding a textual string to a message log, a method for retrieving a message log, etc.

The front-end 112 of the IT workflow orchestration system 102 may comprise the user interface presented on a computing device (e.g., computing device 104-1) of a user that orchestrates one or more of the scripts for execution on a given IT resource or asset of the IT infrastructure 108, and the back-end 118 of the IT workflow orchestration system 102 may comprise a debugging tool running on a management server configured for managing the given IT resource or asset of the IT infrastructure 108. The user interface may comprise a presentation interface configured for setting properties and constraints for input parameters of the given script.

A workflow orchestration system, such as IT workflow orchestration system 102 of FIG. 1 implemented as a VMware vRealize® Orchestrator™ (vRO), may include both a front-end 112 and a back-end 118. The front-end 112 may include a presentation user interface (UI) that allows for running various actions in the front-end of the IT workflow orchestration system 102. The presentation UI of the workflow orchestration system, however, may not have built-in logging capability. In addition, while working in the front-end 112 of the IT workflow orchestration system 102 (e.g., in the presentation UI), it can be difficult (e.g., time consuming, requiring significant manual effort) to obtain logs from the back-end 118 of the IT workflow orchestration system 102. Illustrative embodiments provide techniques for solving these and other issues in plugin development for the IT workflow orchestration system 102, therefore significantly speeding up the process of development and debugging of plugins.

The presentation UI of a workflow orchestration system, as noted above, may be missing built-in logging functionality. Creating a presentation UI for a particular workflow can require significant time and effort. For example, it may take significant time to make import-calls in the presentation UI work properly and as desired. This is due, in part, to logs not being available in the presentation UI or mode (e.g., built-in logging systems of the workflow orchestration system may not work or support the presentation UI). In addition, workflow actions may behave differently in the presentation UI. The same action that is called in the body of a workflow (e.g., a scriptable task) with the same input parameters may work as intended in a schema interface but fail in the presentation UI due to various factors (e.g., strict type checking, different environment, etc.). Further, the presentation UI may provide limited information for debugging purposes (e.g., short and unclear error messages in an editing mode).

In some embodiments, a common logger is implemented that is configured to obtain logs from actions that are called in the presentation UI right in the body of the workflow or by calling a special debugging workflow. The common logger may be implemented using a Java class, an associated scripting class, and special workflows that simplify the process.

As noted above, workflow orchestration systems may also suffer from disadvantages associated with obtaining back-end logs. Consider, as an example, the following process for obtaining back-end logs. First, debugging logs are added to Java methods. Next, a plug-in is built and installed to a server hosting the workflow orchestration system. Methods are then called using front-end scripting classes. To see the back-end logs, a user must navigate to a control center of the workflow orchestration system, export the logs to an archive file (e.g., a ZIP file with a 20 megabyte (MB) archive), unpack the archive file, find the necessary log files, and find the necessary lines or entries among the various information in the log files. This complex, manual process may be replaced in some embodiments utilizing the common logger. The common logger enables a simple front-end call to return the information needed by the user (e.g., using the same Java class described above to write logs into an array list that returns to the front-end methods on demand). Using this approach, embodiments are able to receive logs of events in real-time (e.g., almost immediately) as they happen in the same place in which the events were triggered (e.g., the front-end of the workflow orchestration system).

Figure 3A:
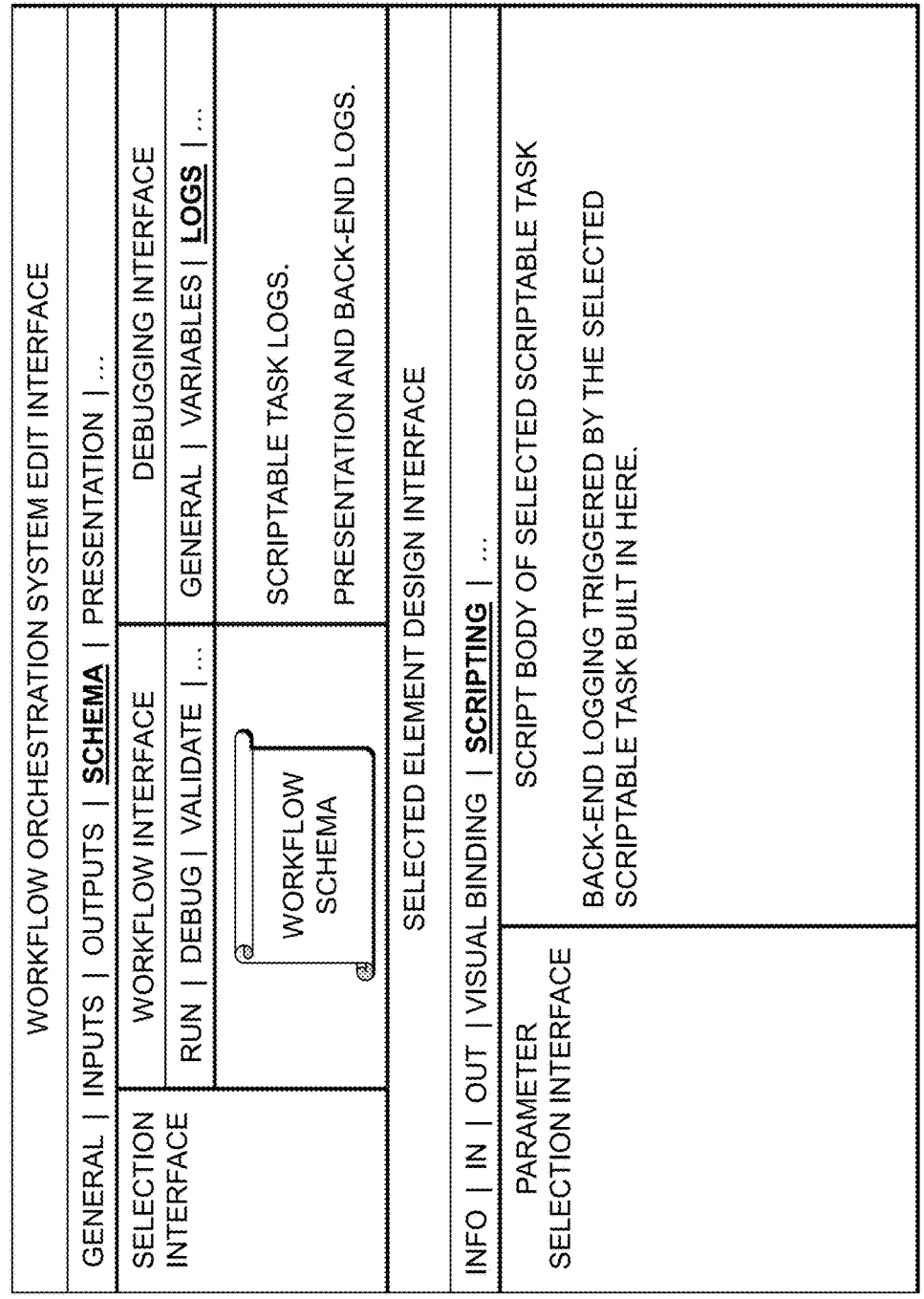
FIG. 3A shows a view of an information technology workflow orchestration system edit interface in an illustrative embodiment.

FIG. 3A shows a view 300 of a workflow orchestration system edit interface. The workflow orchestration system edit interface 300 includes a number of tabs (e.g., general, inputs, outputs, schema, presentation, etc.) of which the schema tab is selected as denoted by the bold underline in the view 300 of FIG. 3A. FIG. 3B shows a view 310 of the presentation tab of the workflow orchestration system edit interface.

The schema tab of the workflow orchestration system edit interface in the view 300 includes: a selection interface that includes an input feature (e.g., a text box) that enables a user to filter among different pieces of reusable code (e.g., organized into different categories such as generic, basic, log, network, etc.) to be included in a workflow schema for a given workflow; a workflow interface illustrating elements (e.g., scriptable tasks, workflows, actions, etc.) that are combined to form the workflow schema for the given workflow, and including options for running, debugging and validating the workflow schema; a debugging interface with various tabs (e.g., general, variables, logs, etc.) of which the logs tab is selected which displays or shows the logs from the JavaScript code that runs from the body of the workflow schema; and an element design interface (shows as a script design interface in the view 300, assuming that the selected element of the workflow schema is a scriptable task) with various tabs (e.g., info, in, out, visual binding, scripting, etc.) of which the scripting tab is selected and a script body of the selected element (e.g., of the selected scriptable task) where logging of the back-end is built into the body of the scriptable task. It should be noted that a workflow schema for a given workflow may include various elements, including one or more actions, one or more other workflows, one or more scriptable tasks, combinations thereof, etc.

The presentation tab of the workflow orchestration system edit interface in the view 310 of FIG. 3B includes: a selection interface that may include input features (e.g., a text-box, an expandable list or tree structure, etc.) that enable a user to filter among different input parameters that call various pieces of reusable code (e.g., actions) that are triggered in the presentation UI; a selected input parameter interface that displays a name or element of the selected input parameter along with an associated description thereof; and an input parameter edit interface which enables a user to view and set different properties of the input parameters (e.g., input values, whether the input parameter is visible in another view such as an inventory interface of the IT workflow orchestration system, a default value, etc.).

As a particular example, assume that the selection interface in the view 310 of FIG. 3B includes an input parameter for a workflow for creating an initiator group in a storage array such as the XtremIO storage array, where the workflow enables a user to create one or more initiator groups and optionally supply an initiator group tag to the created initiator groups. This input parameter may include two sub-parameters for "workflow input" and "advanced options". The workflow input may include sub-parameters such as the management server, cluster name, number of initiator groups, a new initiator group name, a starting index (used when creating more than one initiator group), an optional tag name, and a Boolean for enabling one or more quality of service (QoS) policies. The advanced options may include sub-parameters for QoS policy name and QoS policy state. Some of these parameters may call actions or other pieces of code that write logs. For example, the management server parameter may call an action of "getDefaultRestHost" to retrieve a default value, where this action or piece of code writes logs in the back-end of the IT workflow orchestration system.

Figure 3C:
FIG. 3C shows a view of a workflow executed from the presentation interface of an information technology workflow orchestration system in an illustrative embodiment.

When the above workflow is executed or triggered, the user can see the presentation running as shown in the view 320 of FIG. 3C, which shows input fields for the above-described sub-parameters of the workflow input (which is selected as indicated by the bold underline). It should also be appreciated that other actions (taken outside of a workflow or presentation UI of a workflow orchestration system) may also call back-end methods that write logs. For example, a user may navigate in an inventory tree of the workflow orchestration system, where such navigation (e.g., selecting the volumes of a particular storage array) may trigger back-end methods that write logs.

Figure 4A:
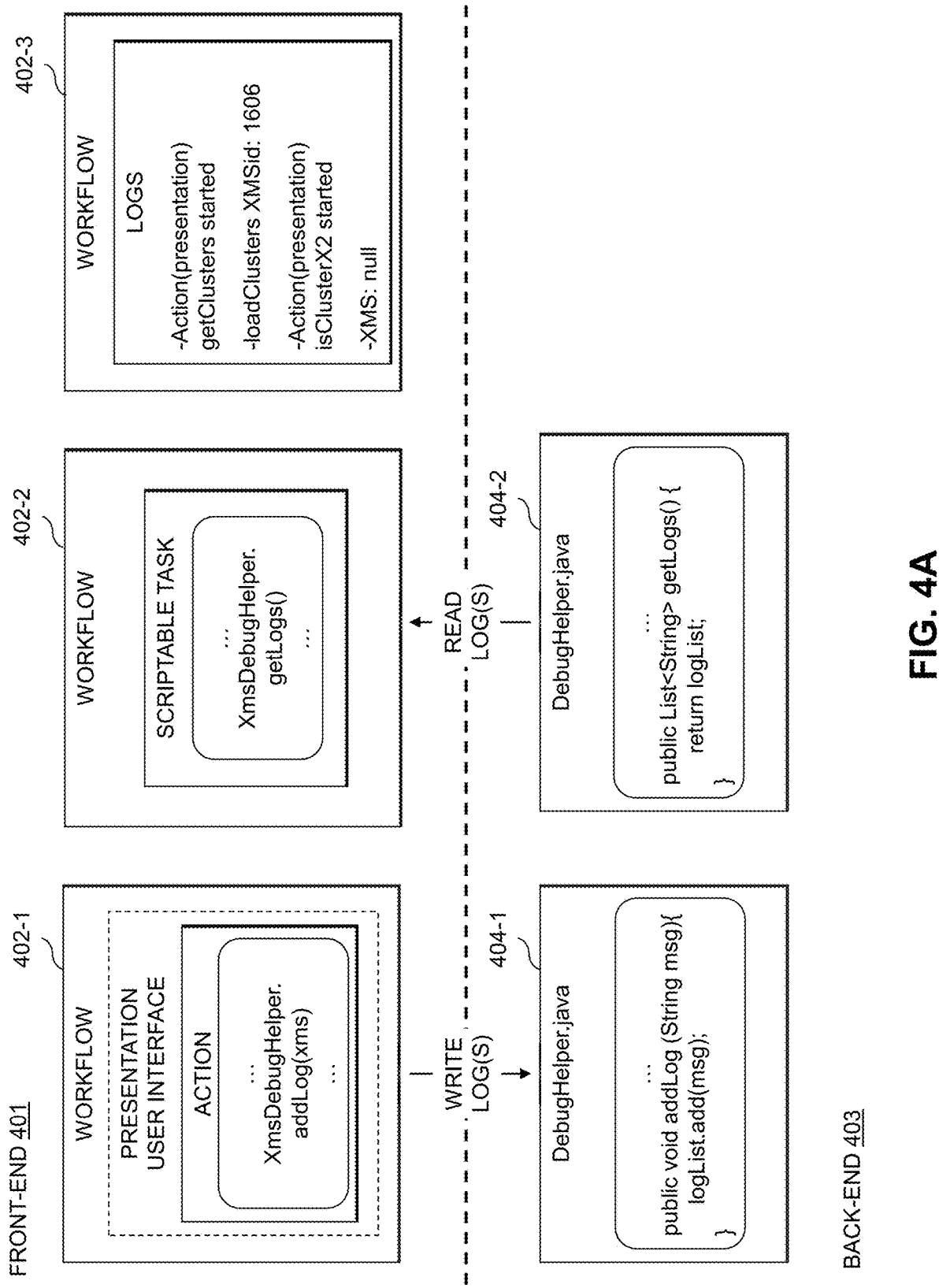
FIG. 4A is a system flow for viewing logs from actions executed in a presentation interface of an information technology workflow orchestration system in an illustrative embodiment.
Figure 4B:
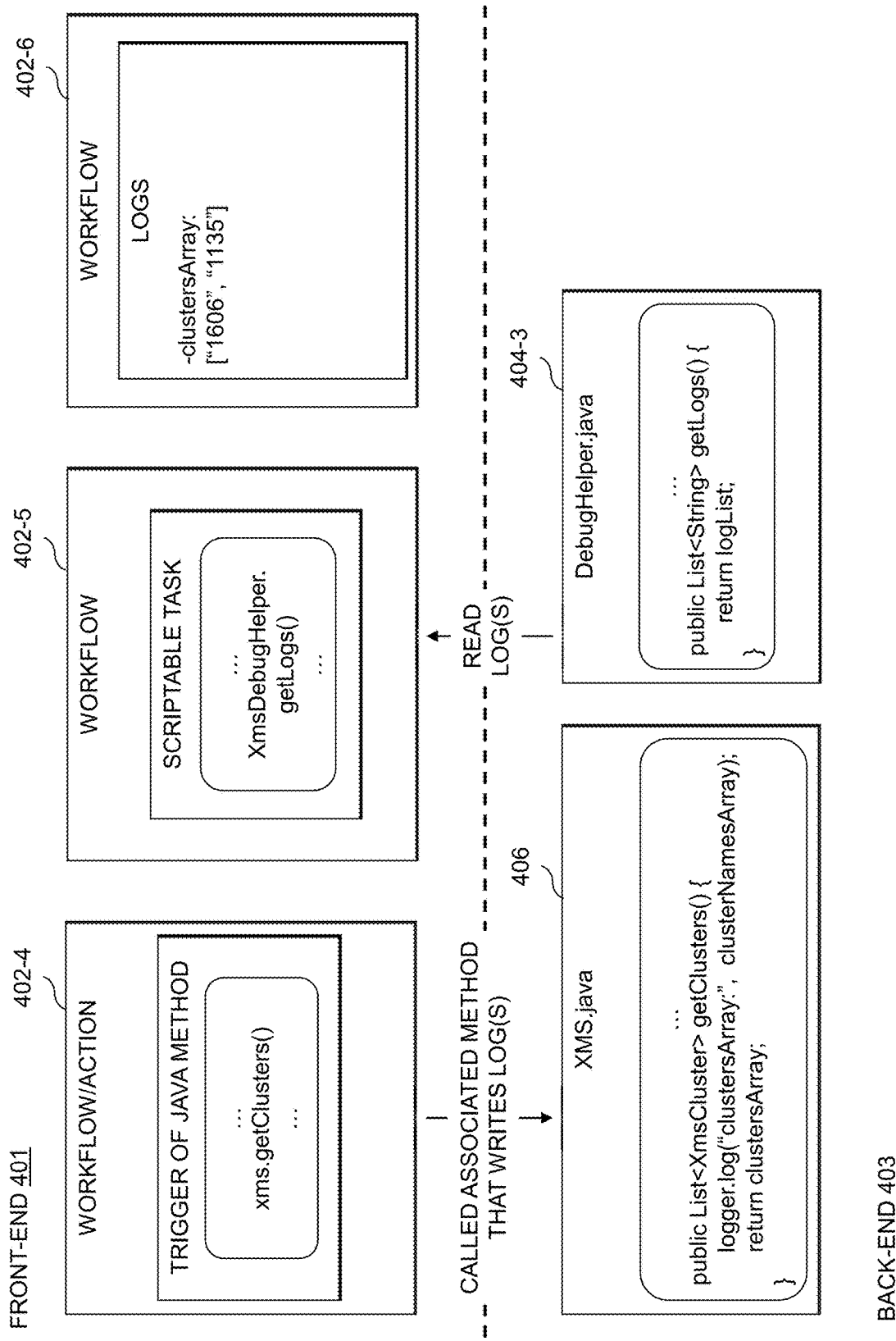
FIG. 4B is a system flow for viewing logs written by back-end methods that are triggered from a front-end of an information technology workflow orchestration system in an illustrative embodiment.

FIGS. 4A and 4B illustrate system flows for viewing logs from the workflow presentation and for viewing back-end logs in the front-end of the workflow orchestration system, respectively. Each of FIGS. 4A and 4B illustrates steps that are performed in both the front-end 401 and back-end 403 of a workflow orchestration system such as IT workflow orchestration system 102. The description that follows assumes that a common logger is implemented for a plugin in vRO for a storage platform such as an XtremIO storage array. vRO provides graphical user interface (GUI)-based IT process automation and orchestration for various management and operational tasks using workflows, across VMware tools and an entire IT infrastructure of an organization or other enterprise using plugins, such as the plugin for the XtremIO storage array. vRO enables users to build custom workflows (e.g., using a set of pre-built workflows and actions) to manage the XtremIO storage array to deliver service-based IT. Examples of tasks that may be accomplished via the plugin include storage configuration and provisioning, scheduling and managing snapshots, managing consistency groups, etc. The plugin may also be used to implement workflows that combine the functionality of an XtremIO storage array with VMware functionality (e.g., creating an Initiator Group for an entire ESX cluster, formatting a VMware datastore on an XtremIO volume, etc.).

The flow of FIG. 4A illustrates a workflow 402-1 in the front-end 401 running in the presentation UI that calls an action of "XmsDebugHelper.addLog(xms)" which causes a write of logs in the back-end 403 in the DebugHelper.java class 404-1 via the command "public void addLog (String msg){logList.add(msg);}". In this instance, "Xms" refers to an XtremIO Management Server. In the front-end 401, a workflow 402-2 containing a scriptable task calls for the logs using the command "XmsDebugHelper.getLogs( )". This causes the logs to be read from the back-end 403 using the DebugHelper.java class 404-2 via the command "public List<String> getLogs( ) {return logList;}". Then, in the front-end 401, the workflow 402-3 displays the logs as illustrated.

The flow of FIG. 4B illustrates a workflow or action 402-4 in the front-end 401 that triggers a Java method "xms.getClusters( )" which causes the write of logs in the back-end 403 via XMS.java class 406. In the front-end 401, workflow 402-5 includes a scriptable task that calls for the logs using the command "XmsDebugHelper.getLogs( )". This causes the logs to be read from the back-end 402 using the DebugHelper.java class 404-3 via the command "public List<String> getLogs( ) {return logList;}". Then, in the front-end 401 the workflow 402-6 displays the logs as illustrated.

In some embodiments, the Java classes are implemented server-side (e.g., by a server running the IT workflow orchestration system 102). The JavaScript may be executed client-side (e.g., on one of the client devices 104), server-side (by the server running the IT workflow orchestration system 102), or by a combination of both. From the client side, a user of one of the client devices 104 may launch software for workflow orchestration that makes the GUI-based workflow orchestration system and associated scripts appear to run locally, but the scripts may be saved server-side and synchronized with the clients immediately (e.g., the scripts may be executed server-side, with the client-side being provided results). JavaScript executed client-side can call Java methods via interfaces provided by the workflow orchestration system (e.g., those Java methods that are represented or proxied by scripting objects or scripting classes). Although described above and elsewhere herein as being implemented using JavaScript and Java classes, it should be appreciated that embodiments may use various other types of coding languages.

A process for implementing a common logger will now be described with respect to making a Java method "addToMemoryLogs" available client-side (e.g., at a front-end 401). First, a special Java class is created as illustrated in the pseudocode 500 of FIG. 5. Next, the scripting object is described in a plugin file for the workflow orchestration system as illustrated in pseudocode 600 of FIG. 6. After compilation and installation of the plugin in the workflow orchestration system, the common logger (e.g., the "addToMemoryLogs" Java method) is made available via APIs client-side in the front-end 401. FIG. 7 shows an example of an API explorer interface 700, which includes a list of available APIs of the XmsDebugHelper including "addToMemoryLogs", an API search interface allowing a user to search for the "addToMemoryLogs" method in the list of available APIs, and a pane showing information regarding the "addToMemoryLogs" method (e.g., its description, signature, parameters and return type). To call the "addToMemoryLogs" method in a script (e.g., a scriptable task, an action, a workflow, etc.), the pseudocode 800 of FIG. 8 may be utilized.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for logging of scripts triggered in a front-end of a workflow orchestration system will now be described in greater detail with reference to FIGS. 9 and 10. Although described in the context of system 100, these platforms may also be used to implement at least portions of other information processing systems in other embodiments.

Figure 9:
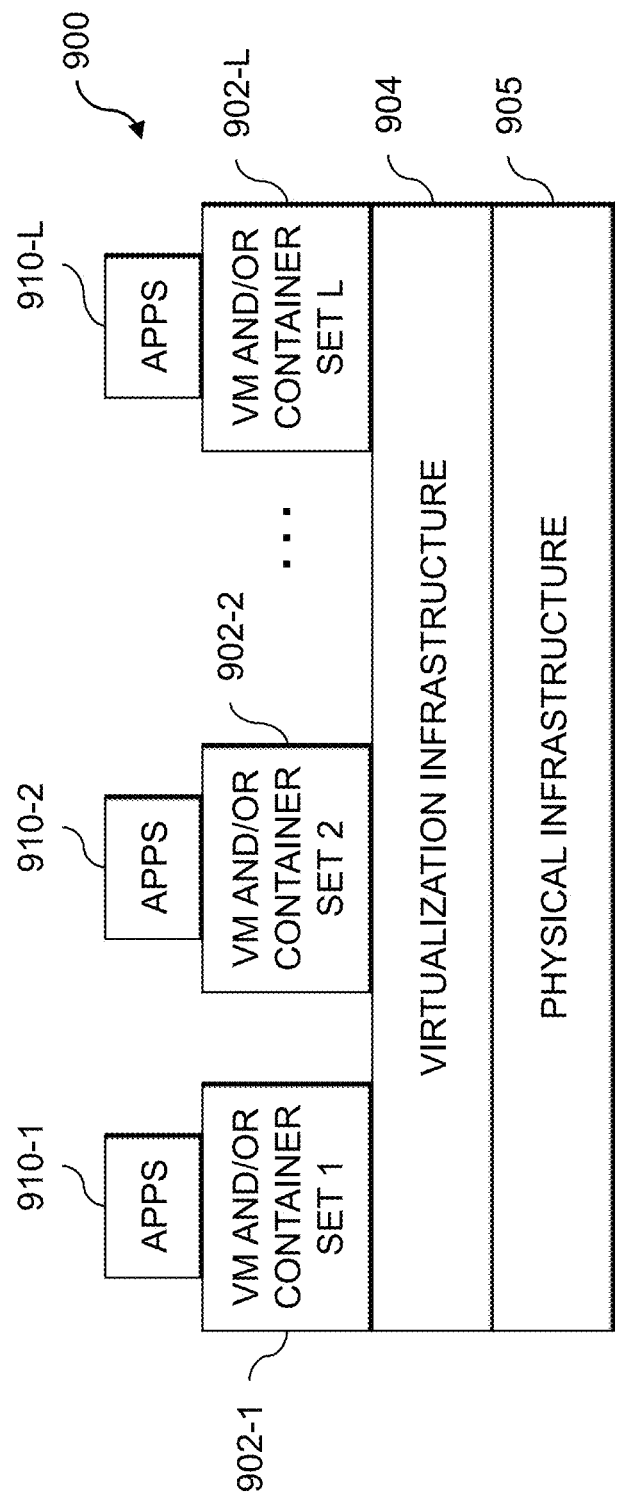
FIGS. 9 and 10 show examples of processing platforms that may be utilized to implement at least a portion of an information processing system in illustrative embodiments.
Figure 10:
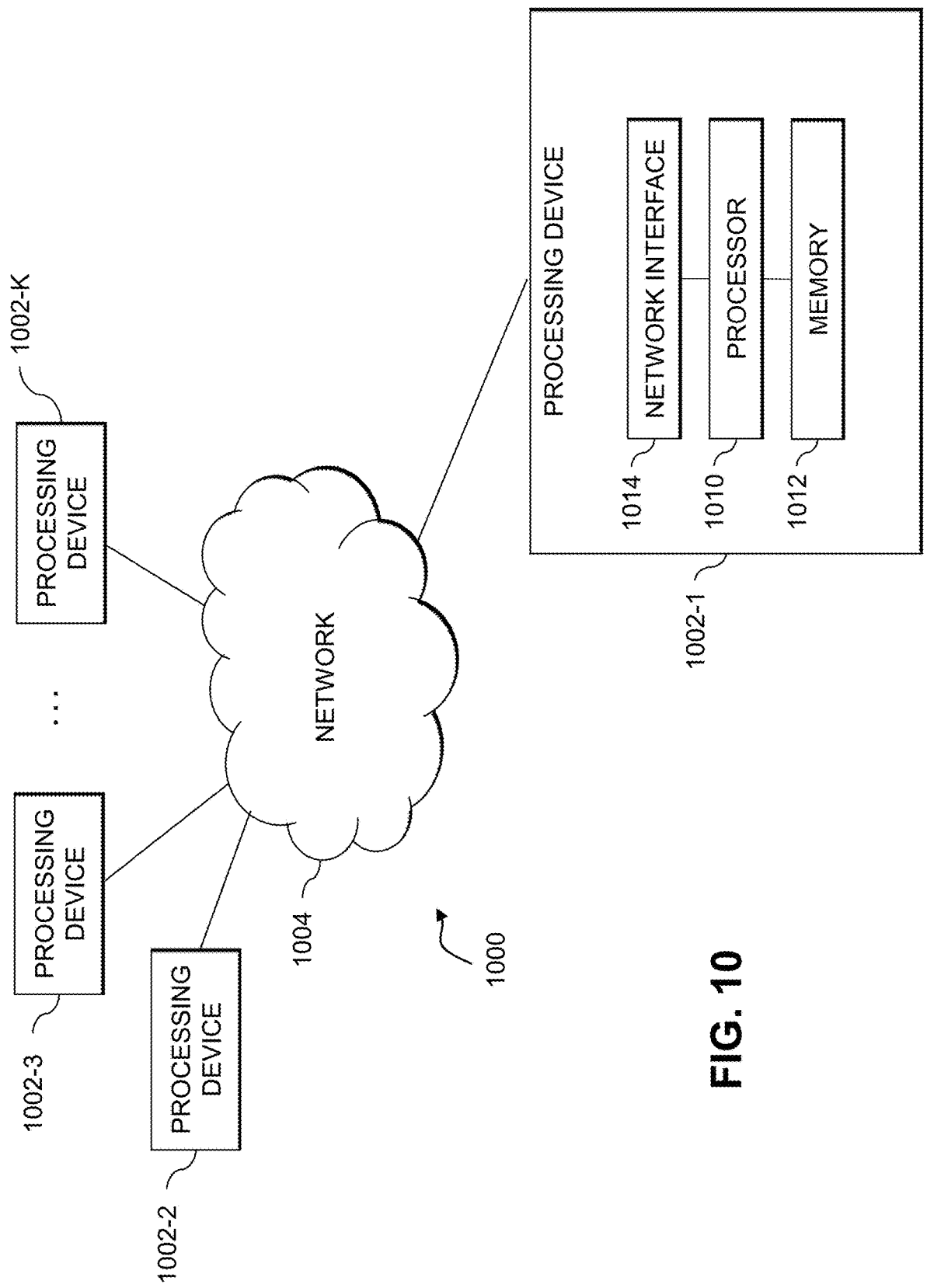

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for logging of scripts executed in an IT workflow orchestration system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, workflows, actions, logs, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to create a logging template comprising a set of instructions for managing logging of scripts executed from a front-end of an information technology workflow orchestration system that are implemented in a back-end of the information technology workflow orchestration system;
   to provide the logging template in a catalog of application programming interfaces in a user interface of the front-end of the information technology workflow orchestration system, the user interface enabling selection of one or more of the set of instructions from the logging template for inclusion in one or more scripts generated in the front-end of the information technology workflow orchestration system;
   to generate a given script by selecting, utilizing the user interface, a set of elements from the catalog of application programming interfaces, the set of elements comprising one or more of the set of instructions from the logging template; and
   to execute the given script in the front-end of the information technology workflow orchestration system;
   wherein executing the given script comprises utilizing at least one of the set of instructions from the logging template to view, in the user interface of the front-end of the information technology workflow orchestration system, logs produced by the back-end of the information technology workflow orchestration system in response to the given script.

2. The apparatus of claim 1 wherein the given script comprises one or more actions configured to be triggered in a presentation interface in the front-end of the information technology workflow orchestration system.

3. The apparatus of claim 2 wherein the one or more instructions of the logging template in the given script comprise:
   a first instruction for writing one or more logs in the back-end of the information technology workflow orchestration system in response to one or more of the actions triggered in the presentation interface in the front-end of the information technology workflow orchestration system; and
   at least a second instruction for reading and viewing, in the presentation interface in the front-end of the information technology workflow orchestration system, the one or more logs written in the back-end of the information technology workflow orchestration system.

4. The apparatus of claim 1 wherein the given script comprises at least one of an action and a workflow configured to be triggered in the front-end of the information technology workflow orchestration system that calls an instruction for writing one or more logs in the back-end of the information technology workflow orchestration system.

5. The apparatus of claim 4 wherein the one or more instructions of the logging template in the given script comprise at least one instruction for reading and viewing, in the front-end of the information technology workflow orchestration system, the one or more logs written in the back-end of the information technology workflow orchestration system.

6. The apparatus of claim 1 wherein the given script is configured to automate one or more orchestration actions for a storage array in an information technology infrastructure, and wherein the back-end of the information technology workflow orchestration system comprises a plug-in executing on a management server of the storage array.

7. The apparatus of claim 6 wherein the plugin comprises one or more Java classes and methods executing in the back-end of the information technology workflow orchestration system configured to be called by JavaScript methods in the front-end of the information technology workflow orchestration system.

8. The apparatus of claim 6 wherein the logging template comprises a Java class with one or more methods for managing logging of the scripts, and wherein the plugin further comprises a description file with descriptions of the one or more methods for managing logging of the scripts, wherein the description file when loaded into the information technology workflow orchestration system is configured to populate the catalog of application programming interfaces with the descriptions of the one or more methods.

9. The apparatus of claim 8 wherein the one or more methods for managing logging of scripts comprise a method for adding a textual string to a message log.

10. The apparatus of claim 8 wherein the one or more methods for managing logging of scripts comprise a method for retrieving a message log.

11. The apparatus of claim 1 wherein the front-end of the information technology workflow orchestration system comprises the user interface presented on a client device of a user that orchestrates one or more of the scripts for execution on a given information technology resource of an information technology infrastructure, and wherein the back-end of the information technology workflow orchestration system comprises a debugging tool running on a management server configured for managing the given information technology resource of the information technology infrastructure.

12. The apparatus of claim 1 wherein the user interface comprises a presentation interface configured for setting properties and constraints for input parameters of the given script.

13. A method comprising steps of:
creating a logging template comprising a set of instructions for managing logging of scripts executed from a front-end of an information technology workflow orchestration system that are implemented in a backend of the information technology workflow orchestration system;
providing the logging template in a catalog of application programming interfaces in a user interface of the front-end of the information technology workflow orchestration system, the user interface enabling selection of one or more of the set of instructions from the logging template for inclusion in one or more scripts generated in the front-end of the information technology workflow orchestration system;
generating a given script by selecting, utilizing the user interface, a set of elements from the catalog of application programming interfaces, the set of elements comprising one or more of the set of instructions from the logging template; and
executing the given script in the front-end of the information technology workflow orchestration system;
wherein executing the given script comprises utilizing at least one of the set of instructions from the logging template to view, in the user interface of the front-end of the information technology workflow orchestration system, logs produced by the back-end of the information technology workflow orchestration system in response to execution of the given script.

14. The method of claim 13 wherein the given script comprises one or more actions configured to be triggered in a presentation interface in the front-end of the information technology workflow orchestration system, and wherein the one or more instructions of the logging template in the given script comprise:
a first instruction for writing one or more logs in the back-end of the information technology workflow orchestration system in response to one or more of the actions triggered in the presentation interface in the front-end of the information technology workflow orchestration system; and
at least a second instruction for reading and viewing, in the presentation interface in the front-end of the information technology workflow orchestration system, the one or more logs written in the back-end of the information technology workflow orchestration system.

15. The method of claim 13 wherein the given script comprises at least one of an action and a workflow configured to be triggered in the front-end of the information technology workflow orchestration system that calls an instruction for writing one or more logs in the back-end of the information technology workflow orchestration system, and wherein the one or more instructions of the logging template in the given script comprise at least one instruction for reading and viewing, in the front-end of the information technology workflow orchestration system, the one or more logs written in the back-end of the information technology workflow orchestration system.

16. The method of claim 13 wherein the given script is configured to automate one or more orchestration actions for a storage array in an information technology infrastructure, and wherein the back-end of the information technology workflow orchestration system comprises a plug-in executing on a management server of the storage array.

17. A computer program product comprising a non-transitory processor-readable storage medium having stored therein program code of one or more software programs, wherein the program code when executed by at least one processing device causes the at least one processing device:
to create a logging template comprising a set of instructions for managing logging of scripts executed from a front-end of an information technology workflow orchestration system that are implemented in a backend of the information technology workflow orchestration system;
to provide the logging template in a catalog of application programming interfaces in a user interface of the front-end of the information technology workflow orchestration system, the user interface enabling selection of one or more of the set of instructions from the logging template for inclusion in one or more scripts generated in the front-end of the information technology workflow orchestration system;
to generate a given script by selecting, utilizing the user interface, a set of elements from the catalog of application programming interfaces, the set of elements comprising one or more of the set of instructions from the logging template; and
to execute the given script in the front-end of the information technology workflow orchestration system;
wherein executing the given script comprises utilizing at least one of the set of instructions from the logging template to view, in the user interface of the front-end of the information technology workflow orchestration system, logs produced by the back-end of the information technology workflow orchestration system in response to execution of the given script.

18. The computer program product of claim 17 wherein the given script comprises one or more actions configured to be triggered in a presentation interface in the front-end of the information technology workflow orchestration system, and wherein the one or more instructions of the logging template in the given script comprise:
a first instruction for writing one or more logs in the back-end of the information technology workflow orchestration system in response to one or more of the actions triggered in the presentation interface in the front-end of the information technology workflow orchestration system; and
at least a second instruction for reading and viewing, in the presentation interface in the front-end of the information technology workflow orchestration system, the one or more logs written in the back-end of the information technology workflow orchestration system.

19. The computer program product of claim 17 wherein the given script comprises at least one of an action and a workflow configured to be triggered in the front-end of the information technology workflow orchestration system that calls an instruction for writing one or more logs in the back-end of the information technology workflow orchestration system, and wherein the one or more instructions of the logging template in the given script comprise at least one instruction for reading and viewing, in the front-end of the information technology workflow orchestration system, the one or more logs written in the back-end of the information technology workflow orchestration system.

20. The computer program product of claim 17 wherein the given script is configured to automate one or more orchestration actions for a storage array in an information technology infrastructure, and wherein the back-end of the information technology workflow orchestration system comprises a plug-in executing on a management server of the storage array.

* * * * *